June 6, 1933.  H. J. CRINER  1,913,047
BREAD SLICING MACHINE
Filed Sept. 26, 1932   2 Sheets-Sheet 1

Harry J. Criner INVENTOR.
BY Bush & Bush
ATTORNEYS.

June 6, 1933.     H. J. CRINER     1,913,047
BREAD SLICING MACHINE
Filed Sept. 26, 1932     2 Sheets-Sheet 2

Harry J. Criner, INVENTOR.
BY Bush & Bush
ATTORNEYS

Patented June 6, 1933

1,913,047

UNITED STATES PATENT OFFICE

HARRY J. CRINER, OF DAVENPORT, IOWA, ASSIGNOR OF ONE-HALF TO A. G. BUSH, OF DAVENPORT, IOWA

BREAD SLICING MACHINE

Application filed September 26, 1932. Serial No. 634,817.

My invention relates to improvements in bread slicing machines.

The objects of my invention are:

1. To provide a simple, efficient bread slicing machine which can be manufactured at low cost;

2. To provide a reciprocating bread slicing machine in which the blades may be readily and quickly replaced and to provide a machine having blades operated in one direction by springs with improved means for guiding the spring-held ends of the blades;

3. To provide a machine in which the weight of the bread traveling down a sloping chute will effectuate the feeding of the bread to the cutting blades and in which at least a part of the blades will act at an angle to assist the feeding movement of the bread;

4. To provide means to counterbalance the variation in pressure of a cam upon a yoke arising from the variance in the length of leverage which the cam has upon the yoke in certain opposite positions.

I attain these objects by the means illustrated in the accompanying drawings, in which,—

Figure 3:
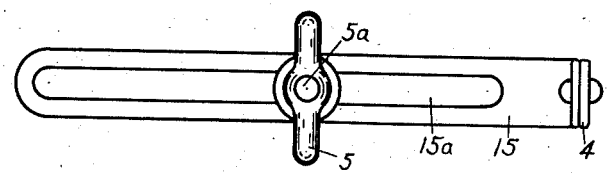
Figure 5:
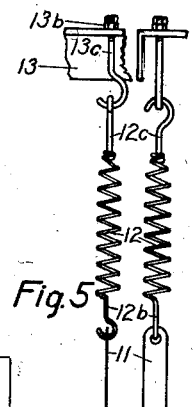
Figure 1:
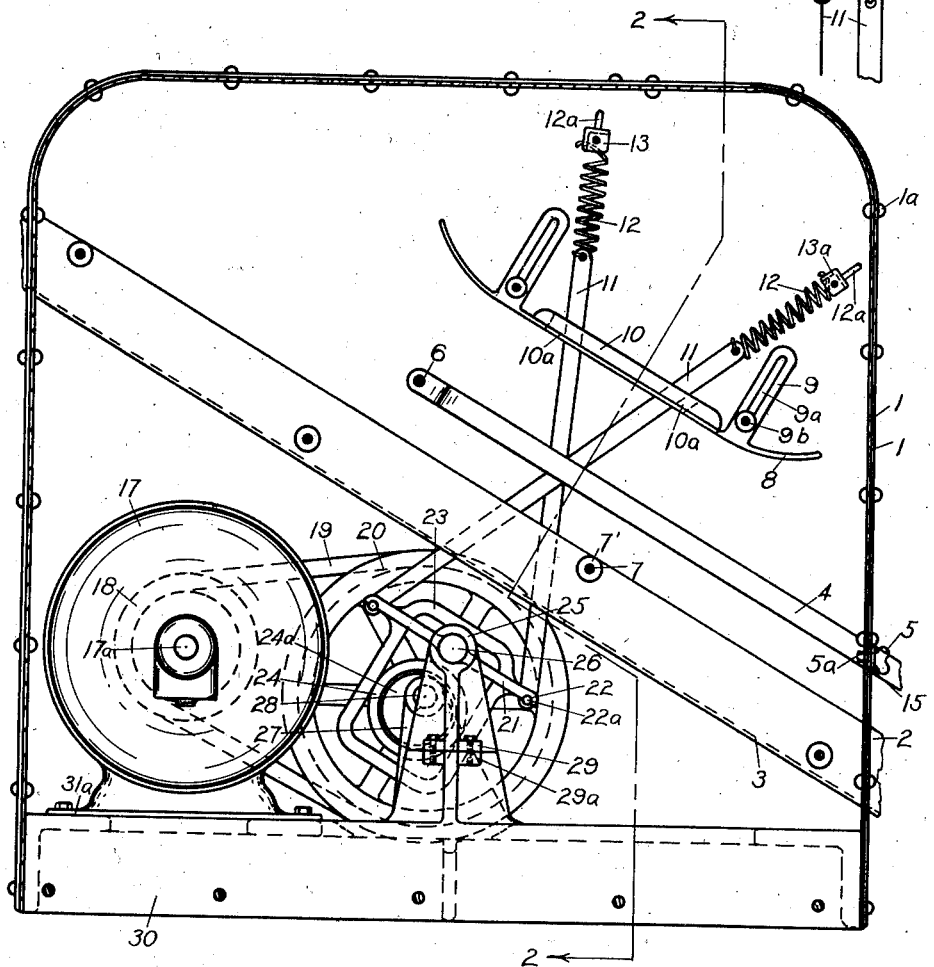
Figure 4:
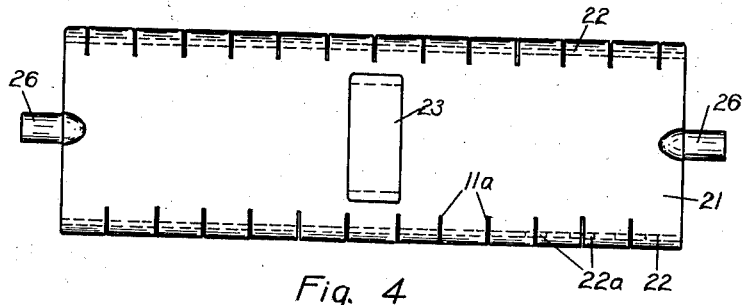
Figure 2:
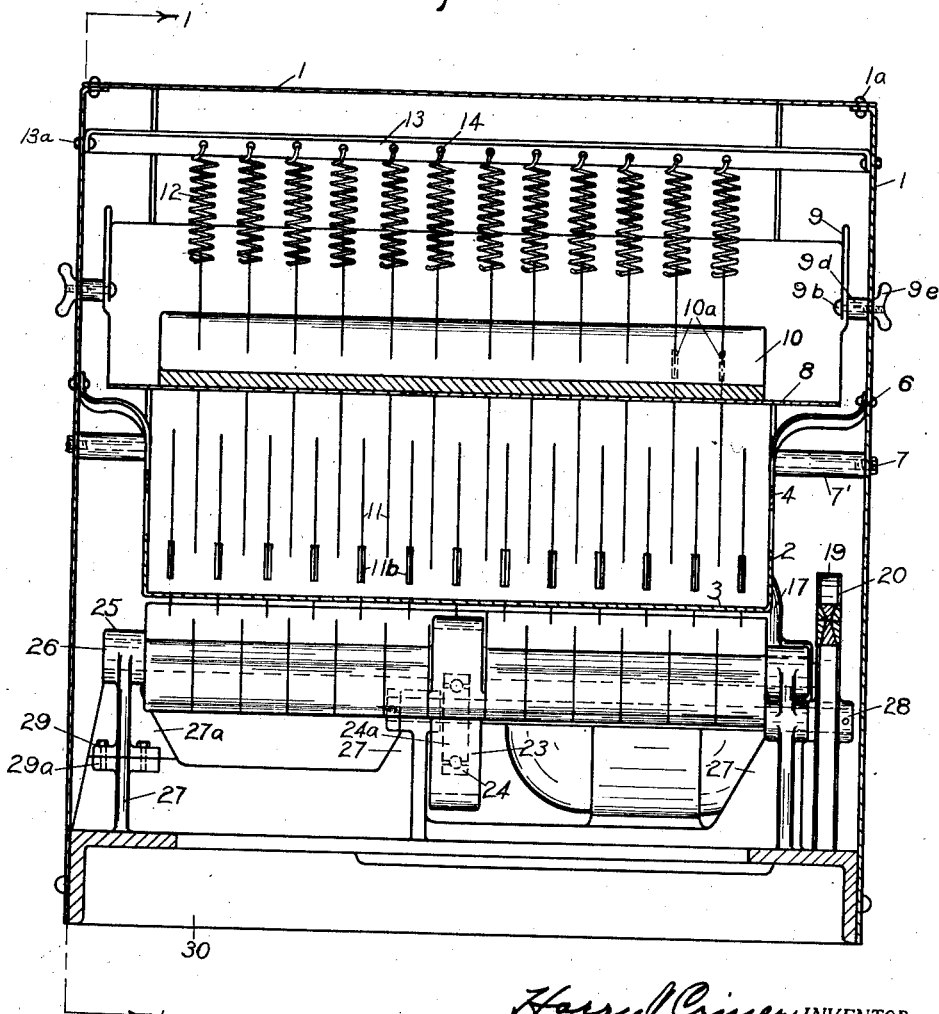

Figure 1 is a side elevation of my machine in section on the line 1—1 of Figure 2; Figure 2 is a vertical section on the line 2—2 of Figure 1; Figure 3 is an enlarged detail showing one of the supports for the lateral guides; Figure 4 is a detail plan view of the rocker plate; Figure 5 is a detail view of an alternate form of fastening for the upper end of the springs.

Similar numerals refer to similar parts throughout the several views.

My apparatus comprises a housing, 1, preferably composed of sheet metal plates suitably united by bolts 1a, forming side, end and top plates, with suitable feed and discharge openings, and having a rectangular base, 30, united to the lower part of the casing by bolts or other suitable means. The rectangular base is preferably formed in section in the form of an angle iron as shown in Figure 2 and upwardly extending ribs, 27, are formed integral with the base to form supports for the motor shaft, 17a, eccentric shaft, 28, and the rocker plate arms, 26.

The ribs, 27, may have bearing boxes formed integral therewith but I prefer to form the outer ribs, 27, in two pieces as shown at the left of Figure 2, the lower piece having a pad, 29a, formed integral therewith and the upper piece, 27a, having a corresponding foot, 29, formed integral therewith adapted to be united to the pad, 29a, by bolts or other suitable means.

A bearing, 25, may be formed integral with the upper piece, 27a, at each side of the machine and in the bearings, 25, I mount revoluble arms, 26, which are preferably formed integral with the rocker plate, 21.

This rocker plate extends transversely of the machine and has a pair of parallel grooves, 22, formed extending entirely across the lower face of the plate near opposite edges thereof. Slots, 11a, are cut in opposite edges of the rocker plate, 21, extending inwardly beyond the grooves, 22. These slots are made just wide enough to form a working fit for the lower ends of the cutting blades, 11. The lower end of each blade has a transverse pin, 22a, united thereto and the pins, 22a, and the grooves, 22, are so proportioned that the pins will fit snugly within the grooves, 22, but not tight enough to bind sufficiently to interfere with the free movement of the rocker plate, 21. The rocker plate, 21, may be made of some oilless bearing material or the grooves, 22, may be lined with graphite, babbitt or other non-frictional material so as to avoid any need of oiling the pins, 22a.

At the middle of the rocker plate, I form integral therewith a rectangular yoke, 23. An eccentric shaft or drive shaft, 28, is mounted in suitable bearings united to two of the ribs, 27, and carries a circular cam, 24a, rigidly united thereto.

The cam, 24a, forms the inner member or inner race of a ball bearing, the outer member, 24, of which contacts with and rolls upon the inner face of the yoke, 23, so as the drive shaft, 28, revolves, the cam and roller bearing cause the yoke, 23, and rocker plate, 21, to oscillate upon the arms, 26, as a pivot.

A driven pulley, 20, is mounted upon the shaft, 28, in line with a drive pulley, 18, which is mounted upon the motor shaft, 17a, and is driven by a belt, 19, which passes over both the motor pulley, 18, and the driven pulley, 20.

The upper ends of the blades, 11, are respectively united to the lower ends of coiled tension springs, 12, the upper ends of which are secured in openings, 14, in the brackets, 13 and 13a, which may be united to the housing by bolts or rivets or other suitable means.

A slotted feed table or chute, 2, is mounted in the housing, 1, and extends outwardly thereof at both ends. This feed table or chute, 2, has slots, 11b, extending through the bottom, 3, of the chute, 2, corresponding in position to the cutting blades and through which the cutting blades respectively operate. The chute, 2, is held in spaced relation to the sides of the casing by spacing sleeves, 7', secured in place by bolts, 7.

In order to guide the upper ends of the cutting blades, I mount a guide plate, 8, in the upper part of the housing extending transversely thereof upon arms, 9, having elongated slots, 9a, formed therein whereby the position of the guide plate, 8, relative to the bottom, 3, of the chute, 2, may be adjusted, the slotted arms, 9, being secured to the sides of the housing, 1, by bolts, 9b, or other suitable means. Upon the plate, 8, I mount an oilless guide block, 10. Slots, 10a, extend through the guide block, 10, and the guide plate, 8, to permit the passage of the saw blades through same.

In order to properly center the loaves of bread passing through the saws, I provide a pair of lateral guides, 4, the upper ends of which are united to the sides of the housing, 1, by rivets, 6, and the lower ends of which are riveted to arms, 15, having elongated slots, 15a, formed therein by which they may be united to the housing by bolts, 5a, and wing nuts, 5, so as to afford ready means for adjusting the position of the lateral guides inwardly as desired. The lateral guides, 4, are formed of relatively light material and preferably of spring material so that the upper end thereof will bend readily to accommodate itself to the adjusted position of the lower end.

The guide plate, 8, may be united to the housing by bolts, 9b, and wing nuts, 9e, with sleeves or spacers, 9d, mounted thereon intermediate the arms, 9, and the adjacent housing.

The guide plate, 8, is so adjusted relative to the feed chute that it acts as a detent to prevent the loaves of bread jumping up in the chute and may be adjusted from time to time to fit the different sized loaves that are sliced.

The springs, 12, are made of sufficient size and strength to retract the blades, 11, during their upward movement as well as to take out all slack from the blades at all times. As the upper ends of the blades are guided steadily by the guide block, 10, they may be attached lightly to the springs so that the springs may be readily removed therefrom and to remove any particular blade it is only necessary to draw down the blades sufficiently to unhook the pin, 22a, from the groove, 22. This will relieve the tension upon the spring, 12, and its upper end may be unhooked. The spring may then be detached from the blade and the blade withdrawn downwardly through the slots in the guide block, 10, plate, 8, and bottom, 3, of the chute.

In using a cam and yoke drive as illustrated, it is obvious that the initial point of pressure of the cam upon the yoke when starting its upward travel will be farther away from the pivot of the yoke, than the initial point of its pressure upon the opposite side of the yoke—in other words, the cam will have a longer leverage when starting upward than when starting downward. This results in an uneven or jerky movement of the machine. To overcome this jerky movement, I prefer to provide means whereby the tension upon each of the blades may be adjusted separately consisting of the crossbar or bracket, 13, of angle iron with hookbolts, 13c, seated therein and adjusting nuts, 13b, one of which is a locknut, threaded upon the upper end of the hook. The upper hook of the spring is hooked into the hook of the hookbolt, 13c.

In addition to this individual adjustment for each blade, I secure the crossbars or brackets, 13, to the housing by bolts, 13a, which may be slid up and down in slots, 12a, and fastened at the desired point thus providing means whereby an entire series of springs may be adjusted at once.

By the use of these adjustments, the springs and blades of one series may be given a higher or greater tension than the springs and blades of the other series and this greater tension may be arranged to counter-balance the inequality due to the variation in the length of the leverage above referred to.

The ends of the springs are preferably made in the form of self-centering hooks, 12b and 12c, so as to maintain a straight line of pull on each blade from its point of attachment to the rocker plate through its point of attachment to the spring and to the point of attachment of the spring to the housing or springbolt.

Any desired form of blade may be used, either with a straight or sinuous edge or toothed blade, as all of these are in common use and well known.

In the operation of my machine, the motor, 17, is started and the belt, 19, drives the pulley, 20. This in turn drives the eccentric shaft, 28, and through the cam, 24a, oscillates the yoke, 23, and rocker plate, 21, thus alternately driving downward the opposed series of cutting blades and as soon as the motion of the rocker plate permits the return of the cutting blades to their upper position, the springs retract them upwardly.

The bread is then placed upon the chute, 2, and slides downwardly by gravity or by manual or mechanical feed as desired, to the cutting blades, 11, and the pressure of the following loaves will assist in driving any given loaf through the cutting blades and on down the chute.

The chute may be placed at such an angle that nothing but gravity is necessary to feed the loaves through it.

I mount my blades in crossed relation as shown and when so mounted, the downward motion of one series of blades will have a tendency to assist the movement of the bread along the chute, as they operate at an acute angle to the chute.

I do not limit my claims to the precise form of apparatus shown as it is obvious that various changes in the form, proportion and relative position of the parts may be adopted without departing from the spirit of my invention.

I claim:

1. A bread slicing machine comprising a housing, a transverse rocker plate mounted to oscillate therein, a yoke united to the rocker plate, a cam shaft revolvably mounted within the housing and carrying a cam mounted within the yoke and adapted to oscillate same as the cam shaft revolves, an oblique feed chute mounted above the rocker plate, sloping downwardly from the front of the machine to and beyond the cutting blades, a plurality of spaced parallel slots in the chute, a plurality of cutting blades arranged in two crossed series passing respectively through the slots in the feed chute each having its lower end pivotally united to the rocker plate and its upper end united to a tension spring mounted within and secured to the housing.

2. A bread slicing machine comprising a housing, a transverse rocker plate mounted to oscillate therein, a yoke united to the rocker plate, an oblique feed chute mounted above the rocker plate, sloping downwardly from the front of the machine to and beyond the cutting blades, a plurality of spaced parallel slots in the chute, a plurality of cutting blades arranged in two crossed series passing respectively through the slots in the feed chute, each having its lower end pivotally united to the rocker plate and its upper end united to a tension spring mounted within and secured to the housing, and means to oscillate the yoke and the rocker plate.

3. A bread slicing machine comprising a housing, a transverse rocker plate mounted to oscillate therein, a longitudinal groove formed in the underside of the rocker plate near one edge thereof, a plurality of transverse spaced slots formed in the grooved edge of the rocker plate and intercepting said groove, a plurality of cutting blades arranged in two crossed series having their lower ends fitted with transverse pins adapted to seat in said grove and pivotally unite them to the rocker plate, means to resiliently unite the upper ends of the blades to the upper part of the housing and means to oscillate the rocker plate.

4. A bread slicing machine comprising a housing, a transverse rocker plate mounted to oscillate therein, longitudinal grooves formed in the underside of the rocker plate near the opposite edges thereof, a plurality of transverse spaced slots formed in the respective groove edges of the rocker plate and intercepting said grooves, a plurality of cutting blades arranged in two crossed series having their lower ends fitted with transverse pins adapted to seat in said grooves and pivotally unite them to the rocker plate, means to resiliently unite the upper ends of the blades to the upper part of the housing and means to oscillate the rocker plate.

5. A bread slicing machine comprising a housing, a transverse rocker plate mounted to oscillate therein, longitudinal grooves formed in one side of the rocker plate near the opposite edges thereof, a plurality of transverse spaced slots formed in the respective grooved edges of the rocker plate and intercepting said grooves, a plurality of cutting blades arranged in two crossed series having one end fitted with transverse pins adapted to seat in said grooves and pivotally unite them to the rocker plate, means to resiliently unite the opposite end of the blades to the housing whereby they are held constantly in tension, and means to oscillate the rocker plate.

6. A bread slicing machine comprising a housing, a transverse rocker plate mounted to oscillate therein, a longitudinal groove formed in the underside of rocker plate near one edge thereof, a plurality of transverse spaced slots formed in the grooved edge of the rocker plate and intercepting said groove, a plurality of cutting blades arranged in two crossed series having their lower ends fitted with transverse pins adapted to seat in said grooves and pivotally unite them to the rocker plate, means to resiliently unite the upper ends of the blades to the upper part of the housing, a yoke united to the rocker plate, a cam shaft extending through the yoke revolvably mounted within the housing and carrying a cam mounted within the yoke and adapted to oscillate same as the cam shaft revolves.

7. A bread slicing machine comprising a housing, a transverse rocker plate mounted to oscillate therein, longitudinal grooves formed in the underside of the rocker plate near the opposite edges thereof, a plurality of transverse spaced slots formed in the respective grooved edges of the rocker plate and intercepting said grooves, a plurality of cutting blades arranged in two crossed series having their lower ends fitted with transverse pins adapted to seat in said grooves and pivotally unite them to the rocker plate, means to resiliently unite the upper ends of the blades to the upper part of the housing a yoke united to the rocker plate, a cam shaft extending through the yoke revolvably mounted within the housing and carrying a cam mounted within the yoke and adapted to oscillate same as the cam shaft revolves.

8. A bread slicing machine comprising a housing, a transverse rocker plate mounted to oscillate therein, longitudinal grooves formed in one side of the rocker plate near the opposite edges thereof, a plurality of transverse spaced slots formed in the respective grooved edges of the rocker plate and intercepting said grooves, a plurality of cutting blades arranged in two crossed series having one end fitted with transverse pins adapted to seat in said grooves and pivotally unite them to the rocker plate, means to resiliently unite the opposite end of the blades to the housing whereby they are held constantly in tension, a yoke united to the rocker plate, a cam shaft extending through the yoke revolvably mounted within the housing and carrying a cam mounted within the yoke and adapted to oscillate same as the cam shaft revolves.

9. A bread slicing machine comprising a housing, a transverse rocker plate mounted to oscillate therein, a plurality of spaced cutting blades arranged in two staggered series, one series of blades having their lower ends pivotally united to one edge of the rocker plate and the other series having their lower ends pivotally united to the opposite edge of the rocker plate, the two series of blades being crossed approximately at the middle thereof, tension springs having their upper ends united to the housing and their lower ends united to the upper ends of the blades respectively, a slotted feed table interposed between the rocker plate and the springs with the blades passing through the slots thereof, a slotted guide plate interposed between the feed table and the springs adapted to hold the spring held end of the blades in alinement with the slots in the feed table, and means to oscillate the rocker plate.

10. A bread slicing machine comprising a housing, a transverse rocker plate mounted to oscillate therein, a plurality of spaced cutting blades arranged in two staggered series, one series of blades having their lower ends pivotally united to one edge of the rocker plate and the other series having their lower ends pivotally united to the opposite edge of the rocker plate, the two series of blades being crossed approximately at the middle thereof, adjustable tension springs having their upper ends united to the housing and their lower ends united to the upper ends of the blades respectively, a slotted feed table interposed between the rocker plate and the springs with the blades passing through the slots thereof, a slotted guide plate interposed between the feed table and the springs adapted to hold the spring-held end of the blades in alinement with the slots in the feed table, and means to oscillate the rocker plate.

11. A bread slicing machine comprising a housing, a transverse rocker plate mounted to oscillate therein, a plurality of spaced cutting blades arranged in two staggered series, one series of blades having their lower ends pivotally united to one edge of the rocker plate and the other series having their lower ends pivotally united to the opposite edge of the rocker plate, the two series of blades being crossed approximately at the middle thereof, tension springs having their upper ends adjustably united to the housing and their lower ends united to the upper ends of the blades respectively, a slotted feed table interposed between the rocker plate and the springs with the blades passing through the slots thereof, a slotted guide plate interposed between the feed table and the springs adapted to hold the spring-held end of the blades in alinement with the slots in the feed table, and means to oscillate the rocker plate.

12. A bread slicing machine comprising a housing, a transverse rocker plate mounted to oscillate therein, a plurality of spaced cutting blades arranged in two staggered series, each blade of one series having one end pivotally united to one edge of the rocker plate and each blade of the other series having one end pivotally united to the opposite edge of the rocker plate, the two series of blades being crossed approximately at the middle thereof, a plurality of tension springs corresponding to the blades, each having one end united to the housing and its opposite end united to the free end of its corresponding blade, a slotted feed table interposed between the rocker plate and the springs with the blades passing through the slots thereof, a slotted guide plate interposed between the feed table and the springs adapted to hold the spring-held end of the blades in alinement with the slots in the feed table, and means for oscillating the rocker plate.

13. A bread slicing machine comprising a housing, a transverse rocker plate mounted to oscillate therein, a plurality of spaced cutting blades crossed and arranged in two staggered series, each blade of one series having one end pivotally united to one edge of the rocker plate and each blade of the other series having one end pivotally united to the opposite edge of the rocker plate, a plurality of tension springs corresponding to the blades, each having one end united to the housing and its opposite end united to the free end of its corresponding blade, a slotted feed table interposed between the rocker plate and the springs with the blades passing through the slots thereof, a slotted guide plate interposed between the feed table and the springs adapted to hold the spring-held end of the blades in alinement with the slots in the feed table, and means for oscillating the rocker plate.

14. A bread slicing machine comprising a housing, a transverse rocker plate mounted to oscillate therein, a plurality of spaced cutting blades arranged in two staggered series, each blade of one series having one end pivotally united to one edge of the rocker plate and each blade of the other series having one end pivotally united to the opposite edge of the rocker plate, the two series of blades being crossed approximately at the middle thereof, a plurality of tension springs corresponding to the blades, each having one end united to the housing and its opposite end united to the free end of its corresponding blade, a slotted feed table interposed between the rocker plate and the springs with the blades passing through the slots thereof, a slotted guide plate interposed between the feed table and the springs adapted to hold the spring-held end of the blades in alinement with the slots in the feed table, means for adjusting the spring tension upon each blade separately, and means for oscillating the rocker plate.

15. A bread slicing machine comprising a housing, a transverse rocker plate mounted to oscillate therein, a plurality of spaced cutting blades arranged in two staggered series, each blade of one series having one end pivotally united to one edge of the rocker plate and each blade of the other series having one end pivotally united to the opposite edge of the rocker plate, the two series of blades being crossed approximately at the middle thereof, a plurality of tension springs corresponding to the blades, each having one end united to the housing and its opposite end united to the free end of its corresponding blade, a slotted feed table interposed between the rocker plate and the springs with the blades passing through the slots thereof, a slotted guide plate interposed between the feed table and the springs adapted to hold the spring-held end of the blades in alinement with the slots in the feed table, means for providing a stronger spring tension upon one series of blades than upon the other series, and means for oscillating the rocker plate.

16. A bread slicing machine comprising a housing, a transverse rocker plate mounted to oscillate therein a plurality of spaced cutting blades crossed and arranged in two staggered series, each blade of one series having one end pivotally united to one edge of the rocker plate and each blade of the other series having one end pivotally united to the opposite edge of the rocker plate, a plurality of tension springs corresponding to the blades, each having one end united to the housing and its opposite end united to the free end of its corresponding blade, a slotted feed table interposed between the rocker plate and the springs with the blades passing through the slots thereof, a slotted guide plate interposed between the feed table and the springs adapted to hold the spring-held end of the blades in alinement with slots in the feed table, means for adjusting the spring tension upon each blade separately, and means for oscillating the rocker plate.

17. A bread slicing machine comprising a housing, a transverse rocker plate mounted to oscillate therein, a plurality of spaced cutting blades crossed and arranged in two staggered series, each blade of one series having one end pivotally united to one edge of the rocker plate and each blade of the other series having one end pivotally united to the opposite edge of the rocker plate, a plurality of tension springs corresponding to the blades, each having one end united to the housing and its opposite end united to the free end of its corresponding blade, a slotted feed table interposed between the rocker plate and the springs with the blades passing through the slots thereof, a slotted guide plate interposed between the feed table and the springs adapted to hold the spring-held end of the blades in alinement with the slots in the feed table, means for providing a stronger spring tension upon one series of blades than upon the other series, and means for oscillating the rocker plate.

18. A bread slicing machine comprising a housing, a transverse rocker plate mounted to oscillate therein, a plurality of spaced cutting blades crossed and arranged in two staggered series, each blade of one series having one end pivotally united to one edge of the rocker plate and each blade of the other series having one end pivotally united to the opposite edge of the rocker plate, a plurality of tension springs corresponding to the blades, each having one end united to the housing and its opposite end united to the free end of its corresponding blade, a slotted feed table interposed between the rocker plate and the springs with the blades passing through the slots thereof, means for providing a stronger tension upon one series of blades than upon the other series, and means for oscillating the rocker plate.

19. A bread slicing machine comprising a housing, a transverse rocker plate mounted to oscillate therein, a plurality of spaced cutting blades arranged in two staggered series, each blade of one series having one end pivotally united to one edge of the rocker plate and each blade of the other series having one end pivotally united to the opposite edge of the rocker plate, the two series of blades being crossed approximately at the middle thereof, a plurality of tension springs corresponding to the blades, each having one end united to the housing and its opposite end united to the free end of its corresponding blade, a slotted feed table interposed between the rocker plate and the springs with the blades passing through the slots thereof, means for providing a stronger spring tension upon one series of blades than upon the other series, and means for oscillating the rocker plate.

In testimony whereof he affixes his signature.

HARRY J. CRINER.